(12) United States Patent
Geffert et al.

(10) Patent No.: US 9,939,079 B2
(45) Date of Patent: Apr. 10, 2018

(54) ROTARY FLUID REGULATOR

(71) Applicant: Dr. Ing. h.c. F. Porsche Aktiengesellschaft, Stuttgart (DE)

(72) Inventors: Thomas Geffert, Freiberg am Neckar (DE); Frank Blum, Siegelsbach (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 18 days.

(21) Appl. No.: 15/132,448

(22) Filed: Apr. 19, 2016

(65) Prior Publication Data

US 2016/0319952 A1    Nov. 3, 2016

(30) Foreign Application Priority Data

Apr. 29, 2015  (DE) .................. 10 2015 106 673

(51) Int. Cl.

| F16K 31/04 | (2006.01) |
|---|---|
| F16K 31/53 | (2006.01) |
| F16K 3/04 | (2006.01) |
| F16K 11/076 | (2006.01) |

(52) U.S. Cl.
CPC .............. F16K 31/047 (2013.01); F16K 3/04 (2013.01); F16K 11/076 (2013.01); F16K 31/043 (2013.01); F16K 31/535 (2013.01)

(58) Field of Classification Search
CPC .... F16K 31/047; F16K 11/076; F16K 31/043; F16K 3/04; F16K 31/535; F16K 3/041
USPC .............. 251/129.11–129.13, 250, 285–288, 251/309–312, 315.01–315.16
See application file for complete search history.

(56) References Cited

U.S. PATENT DOCUMENTS

| 5,417,083 A | * | 5/1995 | Eber | ................ F16K 3/085 |
|---|---|---|---|---|
| | | | | 251/129.11 |
| 5,624,100 A | * | 4/1997 | Bolte | ............... F02D 9/1065 |
| | | | | 251/285 |
| 5,681,025 A | * | 10/1997 | Kuhn | ............. F16K 27/0218 |
| | | | | 251/129.12 |
| 6,186,471 B1 | | 2/2001 | Genga et al. | |
| 6,250,323 B1 | | 6/2001 | Genga et al. | |
| 6,290,207 B1 | | 9/2001 | Genga et al. | |
| 6,371,440 B1 | | 4/2002 | Genga et al. | |

(Continued)

FOREIGN PATENT DOCUMENTS

| DE | 100 53 850 | 5/2002 |
|---|---|---|
| DE | 102004043281 A1 | 3/2006 |

(Continued)

OTHER PUBLICATIONS

Korean Office Action dated Apr. 26, 2017.
German Search Report dated Jun. 17, 2016.
Chinese Office Action dated Dec. 1, 2017.

*Primary Examiner* — John Bastianelli
(74) *Attorney, Agent, or Firm* — Gerald E. Hespos; Matthew T. Hespos; Michael J. Porco

(57) ABSTRACT

A rotary fluid regulator (1) has a housing (2) with an intake opening (3), at least one outlet opening (4), and a hollow valve element (5) that is received rotatably in the housing (2) forming a fluid duct (6). An electromotive drive element (13) is provided and rotates the valve element (5). Rotation of the valve element (5) enables a fluidic connection between the intake opening (3) and at least one outlet opening (4) to be adjusted or blocked.

8 Claims, 4 Drawing Sheets

(56) References Cited

U.S. PATENT DOCUMENTS

| | | | |
|---|---|---|---|
| 6,913,241 B2 * | 7/2005 | Bernarding | F01P 7/167 251/129.12 |
| 7,325,782 B2 * | 2/2008 | Gebler | F16K 31/003 251/129.11 |
| 7,963,455 B2 | 6/2011 | Heldberg | |
| 8,985,288 B2 | 3/2015 | Battlogg et al. | |
| 2003/0051759 A1 | 3/2003 | Schmidt et al. | |
| 2009/0114169 A1 | 5/2009 | Heldberg | |
| 2010/0162776 A1 | 7/2010 | Bose | |
| 2010/0175692 A1 | 7/2010 | Rasmussen | |
| 2011/0217186 A1 | 9/2011 | Yoshizawa | |
| 2012/0313020 A1 | 12/2012 | Battlogg et al. | |
| 2015/0184769 A1 | 7/2015 | Battlogg et al. | |
| 2016/0010536 A1 | 1/2016 | Murakami et al. | |

FOREIGN PATENT DOCUMENTS

| | | |
|---|---|---|
| DE | 102006038213 A1 | 2/2008 |
| DE | 102207017588 A1 | 10/2008 |
| DE | 10 2011 120 798 | 6/2013 |
| DE | 102014200844 A1 | 7/2015 |
| JP | S6162685 A | 3/1986 |
| JP | H01283489 A | 11/1989 |
| JP | 2014077532 A | 5/2014 |
| JP | 2014194252 A | 10/2014 |

* cited by examiner

ROTARY FLUID REGULATOR

CROSS REFERENCE TO RELATED APPLICATION

This application claims priority under 35 USC 119 to German Patent Appl. No. 10 2015 106 673.4 filed on Apr. 29, 2015, the entire disclosure of which is incorporated herein by reference.

BACKGROUND

1. Field of the Invention

The invention relates to a rotary fluid regulator, in particular a rotary fluid regulator for controlling a fluid flow in a motor vehicle.

2. Description of the Related Art

DE 10 2011 120 798 A1 discloses a rotary fluid regulator with a rotary disk received rotatably in a housing. The fluid flow is led through openings perpendicular to the plane of the rotary disk so that a diversion of the fluid through 180° is performed in the housing with an adverse effect on the pressure drop.

DE 100 53 850 A1 discloses a rotary fluid regulator with an eccentric valve having a pivotable disk that can be placed in contact with a valve seat. The disk pivots from the valve seat to control a fluid flow through an outlet opening. The pressure drop is still very considerable due to the position of the disk when opening of the valve.

It is the object of the invention to provide a rotary fluid regulator that is of simple construction while permitting good adjustability or regulation of fluid flows with a small pressure drop and an energy-saving setting of an intermediate position.

SUMMARY

The invention relates to a rotary fluid regulator having a housing with an intake opening, at least one outlet opening, and a valve element that is received rotatably in the housing. The valve is of hollow to form a fluid duct. An electromotive drive element is provided for rotating the valve element so that a fluidic connection between the intake opening and at least one outlet opening can be adjusted or blocked. In this way, it is possible to control or adjust a fluid flow without having a significant pressure drop when the flow through the valve element is at a maximum. It is also possible to realize a simple reduction of the throughflow and possibly also a distribution to different outlet openings.

Two or more outlet openings may be provided so that a fluid flow can be distributed to either or both outlet openings.

The electromotive drive element may be an electric motor with an output element that is connected by a mechanism to the valve element to rotate the valve element with particularly effective actuation and good adjustability.

The mechanism may be a toothed-rack mechanism or a toothed-wheel mechanism. In this way, the rotational movement of the output element of the drive element can be converted into a rotational movement of the valve element. An adaptation of the rotational speed optionally may be performed.

A brake element may be provided to block the position of the valve element in the housing. The brake element makes it possible for the valve element to be immobilized and without having the drive motor energized constantly, which requires high levels of electrical current. The blocking action enables the motor to be deactivated in these operating situations, because the brake element performs the blocking or immobilization of the valve element in the set position.

The brake element may be a magnetorheological brake element that may be controlled by activation or deactivation of a magnetic field. A magnetorheological medium is interlinked when a magnetic field is applied so that movement in the medium is more difficult or impossible. Thus, an element in the medium may be immobilized. Interlinking is eliminated when the magnetic field is deactivated again, and the movement through the medium again is made possible or easier. The brake element may be used so that the movement is prevented completely or so that the speed is reduced.

The magnetorheological medium may be a magnetorheological fluid or a powder with dry magnetorheological elements.

The magnetorheological brake element may have a displaceable element received in a chamber. A magnetorheological material may be received in the chamber and, in the magnetized state, inhibits displacement of the displaceable element in the chamber, but, in the non-magnetized state, does not significantly inhibit the displacement of the displaceable element. In this way, it is possible, through the generation or deactivation of a magnetic field, to realize braking, and thus immobilization, of an element in a chamber. The element may be connected to the valve element so that the valve element can be set in the respective position.

The displaceable element may be piston or slide that is longitudinally displaceable in a chamber. It is thus possible for an adjustment of the valve element to be performed by a longitudinal or axial movement.

The displaceable element may be a rotary piston or rotary slide that is rotationally displaceable in a chamber. It is thus possible for an element that performs a rotational movement to be adjusted and immobilized. In this way, it is possible to immobilize a rotational movement of a valve element by an element that can also perform a rotational A force store element, such as a spring, may be provided and may act on the mechanism or on the valve element so that, in the non-driven state, a force is caused to act in the direction of an end position of the valve element to move the valve element into said end position. In this way, it is possible to realize a safety function that is imparted through the assumption of a defined setting in the event of a fault or in the de-energized state. In such a situation, the force store element displaces the valve element into a defined position for example through the exertion of an action on the mechanism.

Below, the invention will be discussed in detail on the basis of an exemplary embodiment and with reference to the drawings.

DETAILED DESCRIPTION

Figure 1:
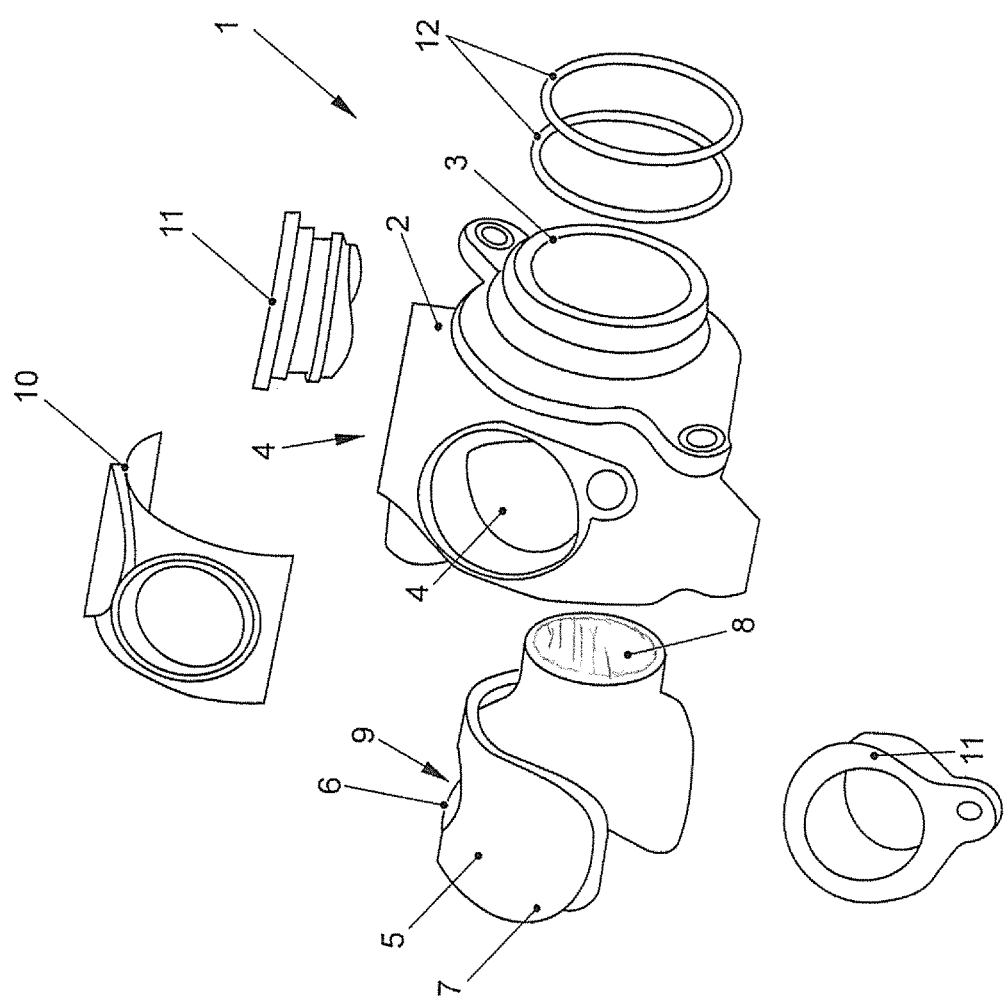
FIG. 1 is an exploded illustration of a rotary fluid regulator.

FIG. 1 is an exploded view of an exemplary embodiment of a rotary fluid regulator 1. Here, individual components of the rotary fluid regulator are illustrated separately from one another so that they can be seen more clearly.

The rotary fluid regulator 1 has a housing 2 with an intake opening 3 and at least one outlet opening 4. In the exemplary embodiment, two outlet openings 4 are provided. The intake opening 3 is arranged on an axial face of the housing 2, and the two outlet openings 4 are arranged on a radially outer wall.

A rotatable valve element 5 is received in the housing 2 and connects the intake opening 3 to at least one of the outlet openings 4 or to neither of the outlet openings 4. One of the outlet openings 4, both of the outlet openings 4 or neither of the outlet openings 4 connect to the intake opening 3 depending on the position of the valve element 5 in the housing 2.

The valve element 5 is hollow and forms a fluid duct 6 that runs in the valve element 5 initially in an axial direction from the right side, but subsequently is curved and opens out in a radial direction on a radial circumferential wall 7 of the valve element 5. The inlet opening 8 of the valve element 5 is in fluidic communication with the intake opening 3, whereas the outlet opening 9 of the valve element 5 can be connected fluidically to at least one of the outlet openings 4 of the housing 2 by rotating the valve element 5 in the housing 2. In this way, a targeted connection between the intake opening 3 and at least one of the outlet openings 4 can be generated.

The valve element 5 has a fitting that engages into the intake opening to be connected there. The fitting has a circumferential wall that can slide in the housing 2, wherein the openings of the valve element 5 are provided radially at the outside on the circumferential wall and can be aligned with at least one of the outlet openings depending on the position of the valve element.

A sealing element 10 is arranged radially between the valve element 5 and the housing inner wall of the housing 2 to seal off the respective outlet opening with regard to leakage flows. Thus, an outflow of a fluid is prevented In the situation in which the outlet opening 9 of the valve element 5 does not align with the outlet opening 4 of the housing 2.

Sealing fittings or connector fittings 11 are inserted into the outlet openings 4 from the outside to realize a fluid connector.

The valve element 5 is arranged to be sealed off with respect to the housing 2 in the region of the intake opening 3 by way of the sealing rings 12, such as O-rings.

An electromotive drive element 1 is provided on the housing 2 for driving the valve element 5 in rotation. A fluidic connection between the intake opening 3 and at least one outlet opening 4 can be adjusted or blocked by rotation of the hollow valve element. The electromotive drive element 13, such as an electric motor, has an output element 14, such as an output shaft, that can be set in rotation.

The valve element 5 also has a shaft or can be connected to one, such that a mechanism 15 can be provided between the valve element 5 and the output element 14 to convert the drive rotational movement of the electromotive drive element 13 into a rotational movement of the valve element 5.

Figure 3:
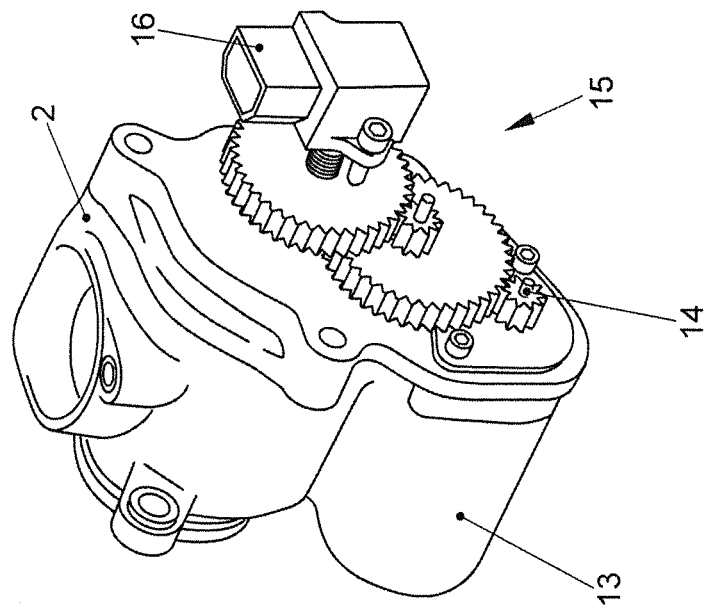
FIG. 3 is another schematic view of the rotary fluid regulator of FIG. 2.
Figure 2:
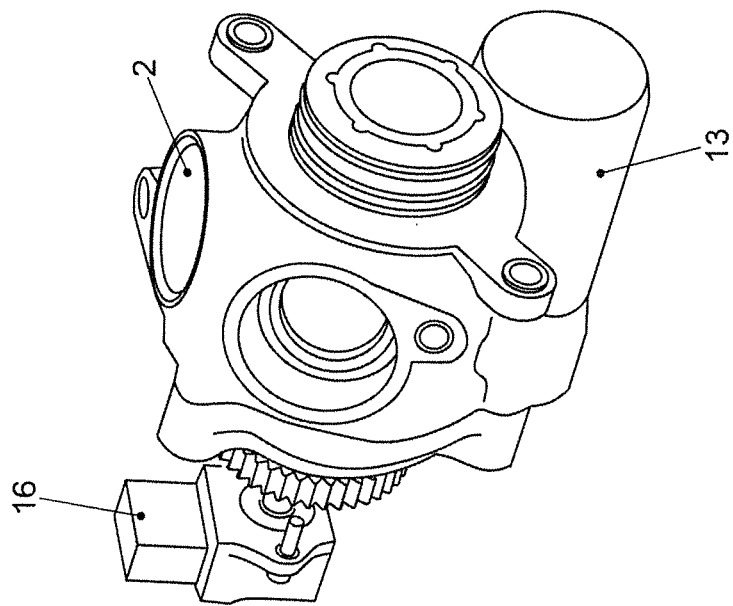
FIG. 2 is a schematic view of a first embodiment of a rotary fluid regulator.

In FIGS. 2 and 3, the mechanism 15 is a toothed-wheel mechanism with a two-stage speed reduction configuration.

The mechanism, however, also may be of some other form, for example a worm mechanism or in the form of a single-stage or multi-stage mechanism. The mechanism 15 is arranged on that side of the housing 2 that is averted from the intake opening.

A sensor 16 is provided for detecting the rotational position of the valve element 5 in the housing 2. The sensor may be a Hall sensor or the like.

Figure 5:
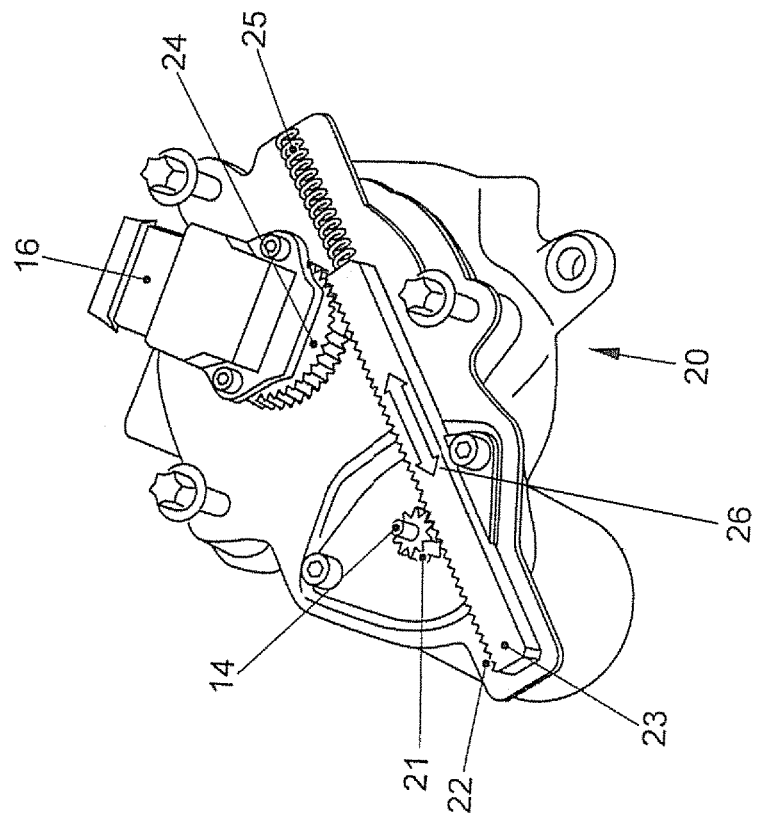
FIG. 5 is a further schematic view of the rotary fluid regulator of FIG. 4.
Figure 4:
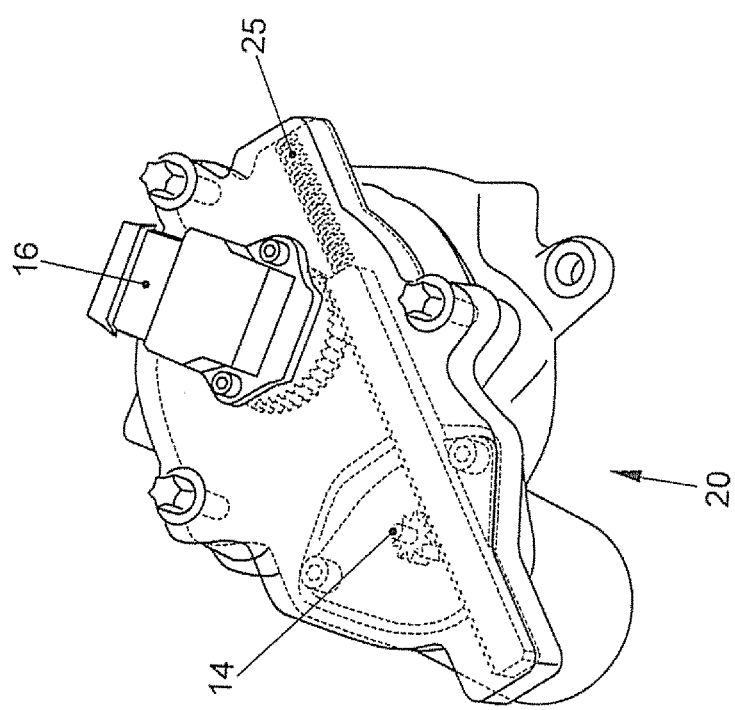
FIG. 4 is a schematic view of a further embodiment of a rotary fluid regulator.
Figure 6:
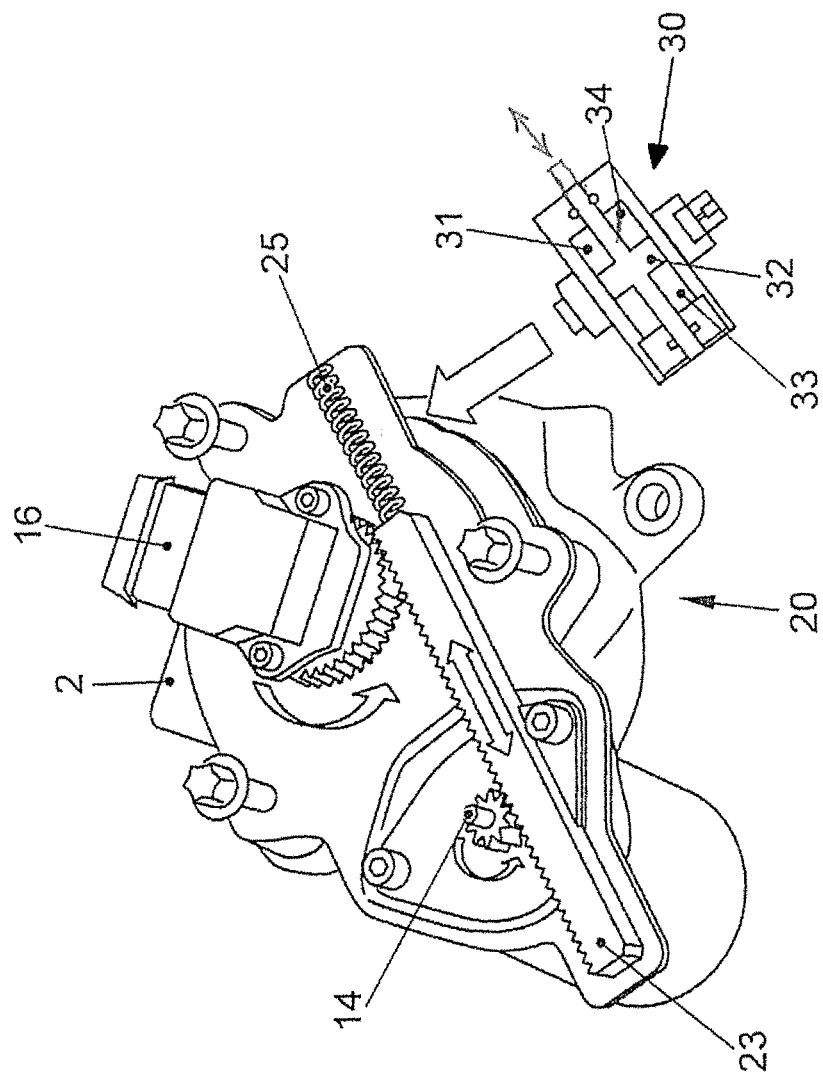
FIG. 6 is an exploded perspective view of the rotary fluid regulator of FIG. 4.

FIGS. 4 to 6 show a modification of the embodiment of FIGS. 1 to 3 and has a toothed-rack mechanism 20 with a toothed wheel 21 that connects to the output element 14 of the electromotive drive element 13. The toothed wheel 21 meshes with the toothing 22 of the toothed rack 23. A toothed wheel 24 also is connected to the valve element 5 and meshes with the toothing 22 of the toothed rack 23. Displacement of the toothed rack 23 causes a drive movement to be transmitted from the electromotive drive element 13 to the valve element 5.

FIGS. 4 and 5 show a force store element 25 that acts on the mechanism or on the valve element so that, in the non-driven state, a force acts in the direction of an end position of the valve element 5 so that the valve element 5 moves into the end position. The illustrated force store element 25 acts on the toothed rack 23 in the longitudinal direction indicated by the arrow 26. Thus, a failsafe function is realized. The force store element 25 may be a rotary spring or wrap spring that acts on the mechanism. The spring also may be provided in the embodiments of FIGS. 1 to 3, for example so as to act on a toothed wheel. This, however, is not shown.

FIG. 6 shows, in a further embodiment with a brake element 30 for blocking the position of the valve element 5 in the housing 2. The brake element 30 is a magnetorheological brake element with a displaceable element 32 that is received in a chamber 31. The chamber 31 also receives a magnetorheological material 33 which, in the magnetized state, inhibits the displacement of the displaceable element 32 in the chamber 31 and, in the non-magnetized state, substantially does not inhibit the displacement of the displaceable element 32 in the chamber 31.

The displaceable element 32 is a piston or slide arranged on a rod 34. The piston, as the displaceable element, is received in longitudinally displaceable fashion in the chamber 31. The rod 34 projects out of the chamber 31 and can be connected, for example, to the toothed rack 23.

It alternatively also is possible for the displaceable element to be formed as a rotary piston or rotary slide that is received in rotationally displaceable fashion in a chamber. This design would be expedient in the case of an embodiment of FIGS. 1 to 3.

The magnetorheological material may be a dry magnetorheological powder or a fluid with magnetic material, in the case of which the application of a magnetic field gives rise to interlinking of elements that inhibit sliding through the material. When the magnetic field is eliminated, the displaceable element can slide through the magnetorheological material.

LIST OF REFERENCE DESIGNATIONS

1 Rotary fluid regulator
2 Housing
3 Intake opening
4 Outlet opening
5 Valve element
6 Fluid duct
7 Circumferential wall 8 Inlet opening
9 Outlet opening
10 Sealing element
11 Connector fitting
12 Sealing ring
13 Drive element
14 Output element
15 Mechanism
16 Sensor
20 Toothed-rack mechanism
21 Toothed wheel
22 Toothing
23 Toothed rack
24 Toothed wheel
25 Force store element
26 Arrow, direction
30 Brake element
31 Chamber
32 Element
33 Magnetorheological material
34 Rod

What is claimed is:

1. A rotary fluid regulator comprising:
a housing with an intake opening and at least one outlet opening;
a hollow valve element received rotatably in the housing and forming a fluid duct;
an electromotive drive element rotating the valve element;
a magnetorheological brake element for selectively blocking movement of the valve element in the housing at a position set by the electromotive drive element or selectively permitting movement of the valve element; and
a force store element that exerts a force on the valve element for urging the valve element toward an end position in a range of movement of the valve element, wherein rotation of the valve element by the electromotive drive element controls a fluidic connection between the intake opening and the at least one outlet opening, and the force store element moves the valve element to the end position of the valve element in response to a de-energized state of the electromotive drive element and magnetorheological brake element.

2. The rotary fluid regulator of claim 1, wherein the at least one outlet opening comprises first and second outlet openings so that a fluid flow can be distributed to the first outlet opening and/or the second outlet opening.

3. The rotary fluid regulator of claim 1, wherein the electromotive drive element is an electric motor, and has an output element connected by way of a mechanism to the valve element to drive the valve element in rotation.

4. The rotary fluid regulator of claim 3, wherein the mechanism is a toothed-rack mechanism or a toothed-wheel mechanism.

5. The rotary fluid regulator of claim 1, wherein the magnetorheological brake element has a displaceable element received in a chamber that contains a magnetorheological material which, in the magnetized state, inhibits displacement of the displaceable element in the chamber and, in the non-magnetized state, substantially does not inhibit the displacement of the displaceable element.

6. The rotary fluid regulator of claim 5, wherein the displaceable element is a piston or slide that is received in longitudinally displaceable fashion in the chamber.

7. The rotary fluid regulator of claim 5, wherein the displaceable element is a type of rotary piston or rotary slide that is received in rotationally displaceable fashion in the chamber.

8. The rotary fluid regulator of claim 1, further comprising a sensor for sensing a rotational position of the valve element.

* * * * *